United States Patent
Murray et al.

(10) Patent No.: US 11,940,882 B2
(45) Date of Patent: Mar. 26, 2024

(54) MIGRATION OF JOURNAL GROUPS IN A STORAGE SYSTEM

(71) Applicant: HEWLETT PACKARD ENTERPRISE DEVELOPMENT LP, Houston, TX (US)

(72) Inventors: Callum Murray, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/814,575

(22) Filed: Jul. 25, 2022

(65) Prior Publication Data

US 2024/0028465 A1    Jan. 25, 2024

(51) Int. Cl.
*G06F 11/14* (2006.01)
*G06F 3/06* (2006.01)

(52) U.S. Cl.
CPC ........ *G06F 11/1453* (2013.01); *G06F 3/0619* (2013.01); *G06F 3/0647* (2013.01); *G06F 3/0683* (2013.01); *G06F 11/1435* (2013.01); *G06F 11/1461* (2013.01)

(58) Field of Classification Search
CPC ............. G06F 11/1453; G06F 11/1461; G06F 11/1435; G06F 3/0683; G06F 3/0619; G06F 3/0647
USPC ........................................................ 707/692
See application file for complete search history.

(56) References Cited

U.S. PATENT DOCUMENTS

| | | | |
|---|---|---|---|
| 6,205,529 B1 | 3/2001 | Shagam | |
| 7,398,363 B2 * | 7/2008 | Innan | G06F 3/067 711/161 |
| 8,819,375 B1 | 8/2014 | Pruett | |
| 8,909,887 B1 | 12/2014 | Armangau et al. | |
| 9,047,296 B2 * | 6/2015 | Pawar | G06F 16/13 |
| 9,189,392 B1 | 11/2015 | Neppalli | |
| 9,928,210 B1 | 3/2018 | Zhang et al. | |
| 10,152,381 B1 | 12/2018 | Shvaiger et al. | |
| 10,216,639 B2 | 2/2019 | Maheshwari | |
| 10,282,256 B1 * | 5/2019 | Patil | G06F 16/1748 |
| 10,346,366 B1 * | 7/2019 | Jacques de Kadt | H04L 51/234 |
| 10,705,918 B1 | 7/2020 | Hu et al. | |
| 11,093,348 B2 | 8/2021 | Lei et al. | |

(Continued)

OTHER PUBLICATIONS

Singhal, Shubhanshi, et al., "A Novel Approach of Data Deduplication for Distributed Storage", International Journal of Engineering & Technology, vol. 7, No. 2.4, © 2018, pp. 46-52.*

*Primary Examiner* — Robert Stevens
(74) *Attorney, Agent, or Firm* — Trop, Pruner & Hu, P.C.

(57) ABSTRACT

Example implementations relate to metadata operations in a storage system. An example includes receiving, by a storage controller of a deduplication storage system, a plurality of data streams to be stored in persistent storage of the deduplication storage system; identifying, by the storage controller, a set of journals in a first journal group that are modified during a first backup process; determining, by the storage controller, a count of the set of journals that are modified during the first backup process; comparing, by the storage controller, the determined count to a migration threshold; and migrating, by the storage controller, at least one journal of the set of journals to a second journal group based at least on a comparison of the determined count to the migration threshold.

20 Claims, 11 Drawing Sheets

(56) References Cited

U.S. PATENT DOCUMENTS

| | | | |
|---|---|---|---|
| 11,132,139 B2* | 9/2021 | Kavuri | G06F 16/1787 |
| 11,803,518 B2 | 10/2023 | Mayo | |
| 2008/0168213 A1* | 7/2008 | Kim | G06F 12/0246 |
| | | | 711/E12.001 |
| 2008/0183642 A1* | 7/2008 | Akelbein | G06F 3/061 |
| | | | 706/3 |
| 2014/0379715 A1* | 12/2014 | Kesselman | G06F 3/0605 |
| | | | 707/737 |
| 2017/0060698 A1* | 3/2017 | Noé | G06F 11/1469 |
| 2017/0357656 A1 | 12/2017 | Gates | |
| 2019/0121705 A1* | 4/2019 | Mayo | G06F 16/1752 |
| 2020/0241784 A1* | 7/2020 | Mayo | G06F 3/0608 |
| 2021/0064477 A1* | 3/2021 | Patel | G06F 11/1076 |
| 2021/0294515 A1* | 9/2021 | Kumar | G06F 3/0659 |
| 2022/0300163 A1* | 9/2022 | Jose | G06F 3/0679 |
| 2022/0391118 A1 | 12/2022 | Mayo | |
| 2023/0237048 A1 | 7/2023 | Mayo | |

* cited by examiner

MIGRATION OF JOURNAL GROUPS IN A STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1A:
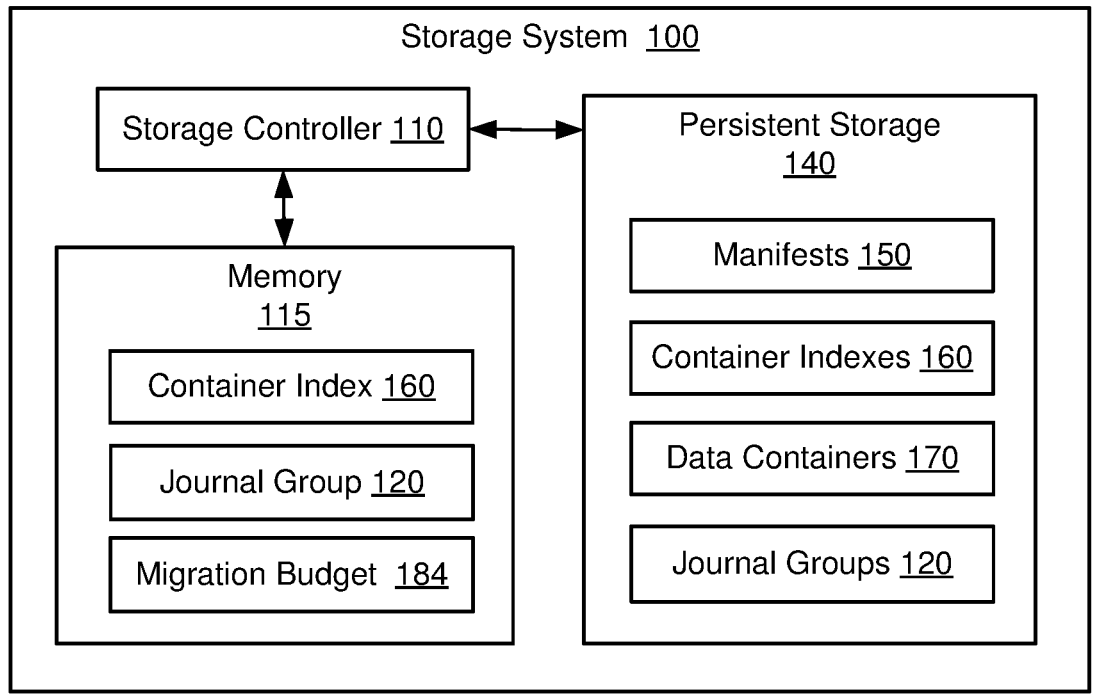
FIGS. 1A-1B are schematic diagrams of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. A data stream (and the backup item that represents it) may correspond to user object(s) (e.g., file(s), a file system, volume(s), or any other suitable collection of data). For example, the storage system may perform a deduplication process including breaking a data stream into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units. In this manner, the deduplication process may reduce the amount of space required to store the received data stream.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a storage system may use stored metadata for processing and reconstructing an original data stream from the stored data units. This stored metadata may include data recipes (also referred to herein as "manifests") that specify the order in which particular data units were received (e.g., in a data stream). In order to retrieve the stored data (e.g., in response to a read request), the storage system may use a manifest to determine the received order of data units, and thereby recreate the original data stream. The manifest may include a sequence of records, with each record representing a particular set of data unit(s). The records of the manifest may include one or more fields (also referred to herein as "pointer information") that identify container indexes that include storage information for the data units. For example, the storage information may include one or more index fields that specify location information (e.g., containers, offsets, etc.) for the stored data units, compression and/or encryption characteristics of the stored data units, and so forth.

In some examples, the storage system may use journals associated with the container indexes. When events occur that would result in changes to the metadata stored in a container index, those changes may be recorded in a journal associated with that container index. Subsequently, when a requirement exists to write the container index to persistent storage, the journal may be written to the persistent storage instead of the container index. Further, because the journal only records the changes to the container index, writing the journal to persistent storage will consume relatively less processing time and bandwidth than would be required if the container index was being written to persistent storage. In some examples, a journal group may be formed from multiple journals. The journal group may be written to the persistent storage as a whole in order to reduce the total number of write operations (i.e., in comparison to performing a different write operation for each journal).

In some examples, the storage system may receive data streams at different points in time, and may generate backup items to represent the received data streams in a deduplicated form. The process of generating a backup item may be referred to herein as a "backup process." In some examples, after completing multiple backup processes, the journals to be accessed during a subsequent backup process may become dispersed over multiple journal groups. As such, performing the subsequent backup process may involve a relatively large number of input/output (I/O) operations to load the multiple journal groups from persistent storage to memory, and to write the multiple journal groups from memory to persistent storage. Accordingly, a relatively large amount of dispersal of the journals across journal groups may reduce the performance of the storage system.

In accordance with some implementations of the present disclosure, a storage system may migrate journals between journal groups to reduce or control the dispersal of the journals. In some implementations, a storage controller may identify a set of journals in a first journal group that are modified during a first backup process. Further, the storage controller may determine a count of the journals in the identified set of journals, and may compare the determined count to a migration threshold. In some implementations, the migration threshold may specify the minimum number of modified journals (i.e., the journals that are modified during a backup process) that should be included in a given journal group (e.g., to avoid migration). The storage controller may migrate a journal to a second journal group (referred to herein as performing a "journal migration") based at least on the comparison of the count of the modified journals to the migration threshold. In this manner, the journals likely to be accessed during a subsequent backup process may be consolidated into fewer journals groups. Accordingly, some implementations may reduce the number of I/O operations for the journals, and may thereby improve the performance of the deduplication storage system. Various details of the migration of journals are described below with reference to FIGS. 1-9.

Figure 1B:
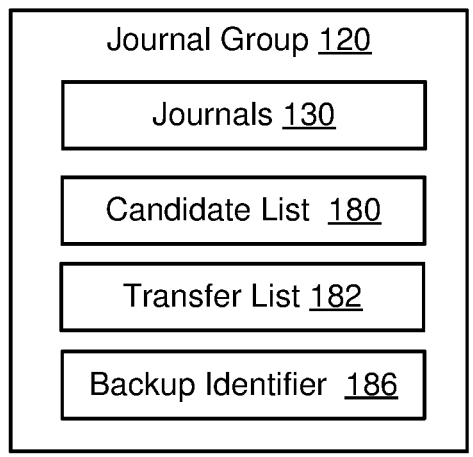

FIGS. 1A-1B—Example Storage System

FIG. 1A shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

In some implementations, the storage system 100 may receive a data stream, and may perform a backup process to create a backup item to represent the received data stream. For example, the storage controller 110 may divide the data stream into data units, and may store at least one copy of each data unit in a data container 170 (e.g., by appending the data units to the end of the data container 170). In some examples, each data container 170 may be divided into portions (also referred to herein as "entities").

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

As shown in FIG. 1A, the persistent storage 140 may store manifests 150, container indexes 160, data containers 170, and journal groups 120. In some implementations, the storage controller 110 may generate a manifest 150 to record the order in which the data units were received. Further, the manifest 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity, and that the entity is stored at a particular offset in a data container 170. Further, the container index 160 may include reference counts that indicate the number of manifests 150 that reference each data unit.

In some implementations, the storage controller 110 may receive a read request to access the stored data, and in response may access the manifest 150 to determine the sequence of data units that made up at least some of the original data stream. The storage controller 110 may then use pointer data included in the manifest 150 to identify the container indexes 160 associated with the data units. Further, the storage controller 110 may use information included in the identified container indexes 160 (and information included in the manifest 150) to determine the locations that store the data units (e.g., data container 170, entity, offsets, etc.), and may then read the data units from the determined locations.

FIG. 1B shows an example implementation of a journal group 120. As shown, a journal group 120 may be a data structure used to group multiple journals 130. Each journal 130 may be associated with a different container index 160. Further, each journal 130 may include information indicating changes to the data stored in the container index 160 associated with that journal 130. For example, when a copy of the container index 160 present in memory 115 is modified to reflect a change to the metadata, that change may also be recorded as an entry in the associated journal 130. Each journal group 120 may be transferred as a whole between the memory 115 and the persistent storage 140. In some implementations, each container index 160 may include information to identify the journal 130 and journal group 120 associated with that container index 160.

As shown in FIG. 1B, each journal group 120 may include a candidate list 180, a transfer list 182, and a backup identifier 186. The backup identifier 186 may be set or updated to identify the backup process that is currently using (e.g., modifying) the journal group 120. The candidate list 180 and the transfer list 182 may be data structures used to identify the journals 130 of the journal group 120 that were modified during backup processes. For example, each of the candidate list 180 and the transfer list 182 may be an ordered array of "flags" to indicate, for each journal 130 of journal group 120, whether the journal 130 was modified during a backup process. Setting such a flag to indicate modification of a corresponding journal may be referred to herein as "flagging" the particular journal 130 in the candidate list 180 or the transfer list 182. In examples described herein, flags may be implemented using Boolean values, binary values (0 or 1), or any other suitable type of data.

In some implementations, the storage controller 110 may include functionality to reduce or limit dispersal of the journals 130 across various journal groups 120. The storage controller 110 may populate the candidate list 180 to flag the journals 130 in a first journal group 120 that are modified during a first backup process. In some implementations, upon detecting initiation of a second backup process, the storage controller 110 may determine a count of the journals 130 that are flagged in the candidate list 180 (i.e., indicating the total number of journals 130 in the first journal group 120 that were modified during the first backup process). The storage controller 110 may detect the initiation of the second backup process by detecting a new or changed backup identifier 186.

In some implementations, if the determined count of journals 130 flagged in the candidate list 180 is below a migration threshold, the storage controller 110 may copy the flags of the candidate list 180 into the transfer list 182 (i.e., to identify the set of journals that were modified during the first backup process), and may clear the candidate list 180 (e.g., reset all flags in the candidate list 180). The storage controller 110 may determine whether any of the journals 130 in the first journal group 120 satisfies a migration condition. As used herein, a "migration condition" refers to at least one condition to be satisfied before migrating the journal 130 to another journal group 120. For example, in some implementations, a migration condition may be satisfied if a journal 130 that is modified during the second backup process is also flagged in the transfer list 182. However, in other examples, a migration condition may be satisfied for any journal 130 that is flagged in the transfer list 182.

In some implementations, if any of the journals 130 in the first journal group 120 satisfy the migration condition, the storage controller 110 may migrate those journals 130 to a second journal group 120 (e.g., a new journal group 120). In this manner, the journals 130 that are modified during a given backup process may be consolidated into fewer journals groups 120. Accordingly, the number of I/O operations used for the journal groups 120 may be reduced, and may thereby improve the performance of the storage system 100. The disclosed migration technique is discussed further below with reference to FIGS. 4A-10.

In some examples, when migrating a journal 130 to a different journal group 120, the corresponding container index 160 may be modified to update the information that identifies its associated journal 130 and journal group 120. As such, the migration of the journal 130 may involve a write I/O for that container index 160 (i.e., to store the modified version of the container index 160 in persistent storage 140). Further, if the storage controller 110 performs more than a given number of journal migrations, the performance cost of writing the associated container indexes 160 may negate or exceed the performance benefit of reducing the number of read I/O operations to transfer the journal groups 120 into memory 115. Accordingly, even if a journal 130 satisfies the migration condition, it may be desirable to block the migration of that journal 130 in order to limit the total number of journal migrations.

In some implementations, the storage controller 110 may use a migration budget 184 to control the number of journal migrations performed during a backup process, and may thereby prevent the performance cost of writing the associated container indexes 160 from negating or exceeding the performance benefit of the journal migrations. The migration budget 184 may be implemented as an unsigned integer counter, and may be set to a predefined value upon initialization of the migration budget 184. For example, the predefined value of the migration budget 184 may be specified by a configuration setting of the storage system 100, by a user input, and so forth. The migration budget 184 may be initialized in response to a system event (e.g., restart, reset, etc.), a user command, and so forth.

In some implementations, the storage controller 110 may decrease the migration budget 184 by a first amount (e.g., one) for each journal migration that is performed in the storage system 100 (e.g., across multiple data streams, across a defined group of data streams, for a single data stream, etc.). When the migration budget 184 is reduced below a minimum threshold (e.g., reduced to a zero value where the minimum threshold is one), the storage controller 110 may suspend performance of any journal migrations. Further, the storage controller 110 may resume performance of journal migrations if the migration budget 184 is increased above the minimum threshold. In this manner, the migration budget 184 may be used to control (e.g., limit) the number of journal migrations performed during a backup process.

In some implementations, the storage controller 110 may increase the migration budget 184 by a second amount (e.g., 0.5) for each write I/O of a container index 160 that is not caused by a journal migration (e.g., a write I/O performed in response to a save command for the container index 160). In some implementations, the migration budget 184 may be capped at a maximum level. For example, the maximum level of the migration budget 184 may be a function of the number of data streams being processed by the storage system 100 (e.g., equal to the number of streams multiplied by a constant value). The disclosed technique using the migration budget 184 is described further below with reference to FIG. 7.

Figure 2:
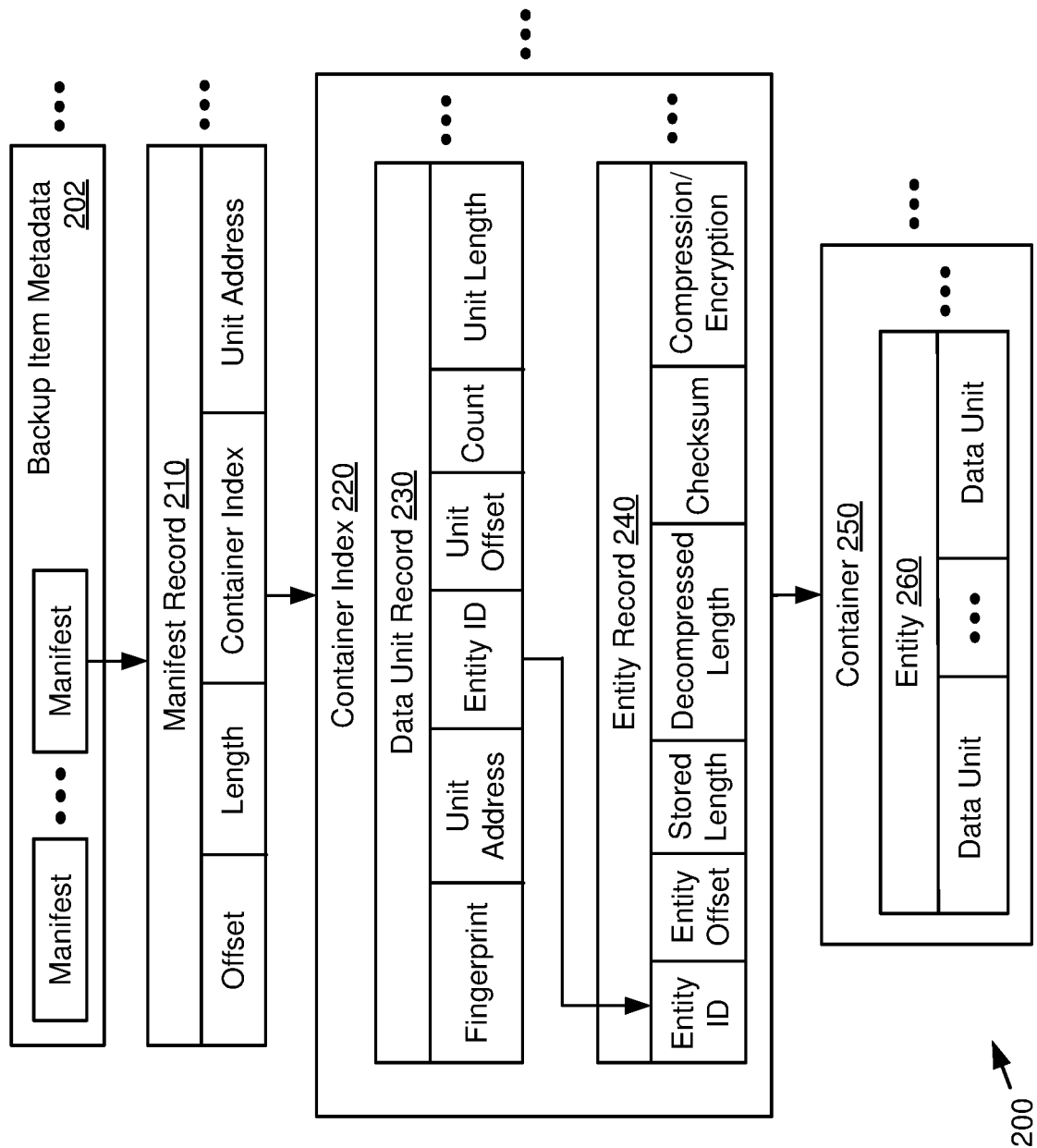
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include backup item metadata 202, a manifest record 210, a container index 220, and a container 250. In some implementations, the backup item metadata 202 may include multiple manifest records 210. In some examples, the manifest record 210, the container index 220, and the container 250 may correspond generally to example implementations of a manifest 150, an index 160, and a data container 170 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address or fingerprint. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, a unit length, or the like, or a combination thereof. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Although one of each is shown for simplicity of illustration in FIG. 2, data structures 200 may include a plurality of instances of backup item metadata 202, each including or pointing to one or more manifest records 210. In such examples, data structures 200 may include a plurality of manifest records 210. The manifest records 210 may reference a plurality of container indexes 220, each corresponding to one of a plurality of containers 250. Each container index 220 may comprise one or a plurality of data unit records 230, and one or a plurality of entity records 240.

Figure 3:
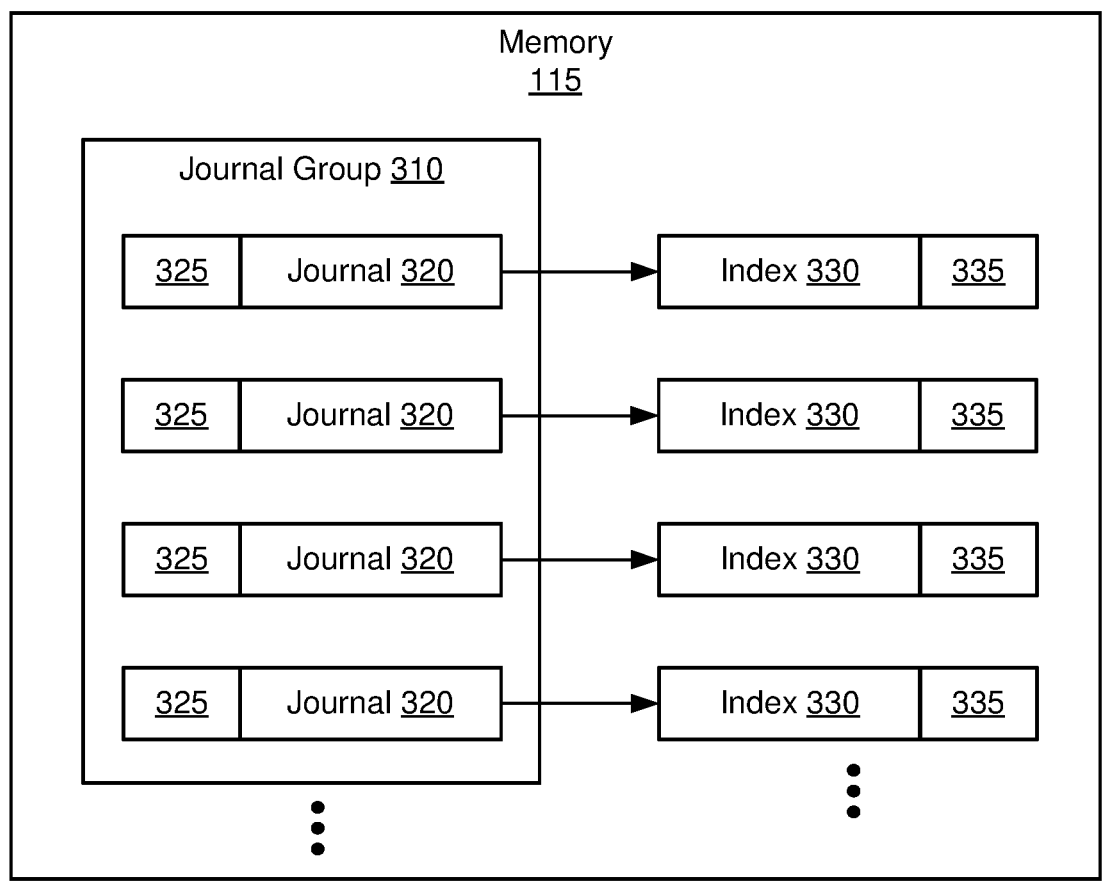
FIG. 3 is an illustration of example data structures, in accordance with some implementations.

FIG. 3—Example Data Structures

FIG. 3 shows an illustration of the memory 115 including a journal group 310 and multiple container indexes 330. As shown, the journal group 310 includes multiple journals 320. In some examples, the journal group 310, journals 320, and container indexes 330 may correspond generally to example implementations of the journal group 120, journals 130, and container indexes 160 (shown in FIG. 1), respectively.

In some implementations, each journal 320 may be associated with a corresponding container index 330, and may record changes to the metadata stored in the corresponding container index 330. Further, each journal 320 may include or be associated with a version number 325. Each container index 330 may include or be associated with a version number 335. In some implementations, the version number 325 may be compared to the version number 335 to determine whether the journal 320 or the associated container index 330 reflects the latest version of metadata. For example, if the version number 325 is greater than the version number 335, it may be determined that the change data included in the journal 320 reflects a state of metadata that is more recent than the metadata stored in the container index 330. If so, the container index 330 may be updated to include the changes recorded in the journal 320. However, if the version number 325 is smaller than the version number 335, it may be determined that the change data included in the journal 320 reflects a state of metadata that is older than the metadata stored in the container index 330. In this situation, the journal 320 may be cleared without updating the container index 330. In some implementations, the comparison of the version number 325 to the version number 335 may be performed in response to loading the journal 320 or the associated container index 330 from persistent storage into memory (e.g., from persistent storage 140 into memory 115, as shown in FIG. 1).

In one or more implementations, the number of journals 320 included in a journal group 310 may be specified in a stored parameter (e.g., a user setting, a configuration variable, and so forth). In some examples, this parameter may be adjusted or tuned to modify the performance characteristics of input/output (I/O) operations in a storage system. For example, this parameter may be increased to attempt to obtain relatively less frequent write I/O operations of relatively larger size. In another example, this parameter may be decreased to attempt to obtain relatively more frequent write I/O operations of relatively smaller size.

FIGS. 4A-4D—Example Journal Migration

FIGS. 4A-4D illustrate an example journal migration, in accordance with some implementations. In particular, FIGS. 4A-4D shows multiple journal groups 410A-410E (also referred to generally as "journal groups 410") at different points in time during a journal migration. In the example of FIGS. 4A-4D, each of journal groups 410 includes four journals 420, and each of journal groups 410 corresponds to a different backup process. Further, in this example, a journal group 410 can undergo a journal migration if the number of journals in that journal group 410 that were modified (i.e., during a backup process) is equal to or less than a threshold value of two. In some implementations, the functions and/or actions illustrated in FIGS. 4A-4D may be performed using the storage system 100 (shown in FIG. 1) (e.g., via storage controller 110 executing instructions stored on a machine-readable storage medium).

Figure 4A:
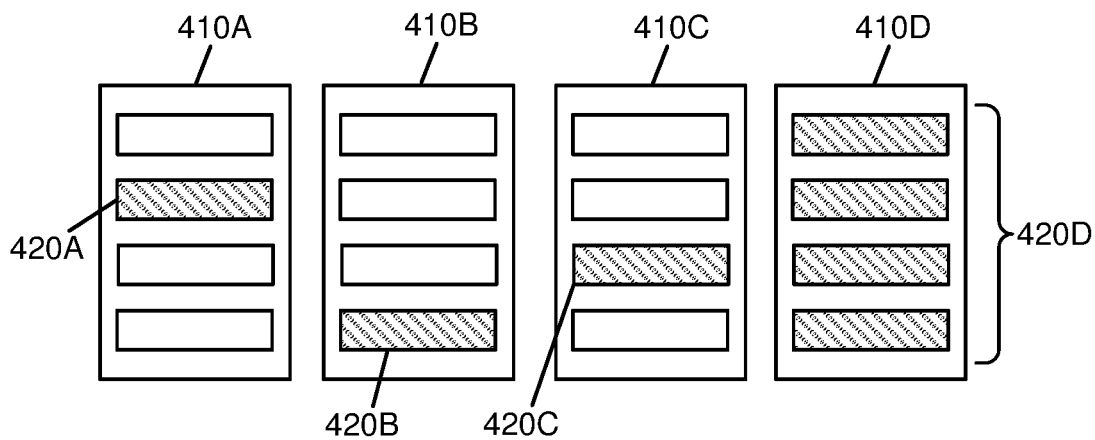
FIGS. 4A-4D are illustrations of an example journal migration, in accordance with some implementations.

In FIGS. 4A-4D, a journal 420 with diagonal hatching indicates that the journal was modified during a given backup process, and a journal 420 without hatching indicates that the journal was not modified during the given backup process. Referring now to FIG. 4A, a first journal group 410A includes one journal 420A (shown with diagonal hatching) that was modified during a backup process. Further, the first journal group 410A also includes three journals (shown without hatching) that were not modified during the backup process. The second journal group 410B includes one journal 420B that was modified during the backup process (shown with hatching) and three journals that were not, and the third journal group 410C includes one journal 420C that was modified during the backup process (shown with hatching) and three journals that were not. Finally, the fourth journal group 410D includes four journals 420D (shown with hatching) that were modified during the backup process.

Figure 4B:
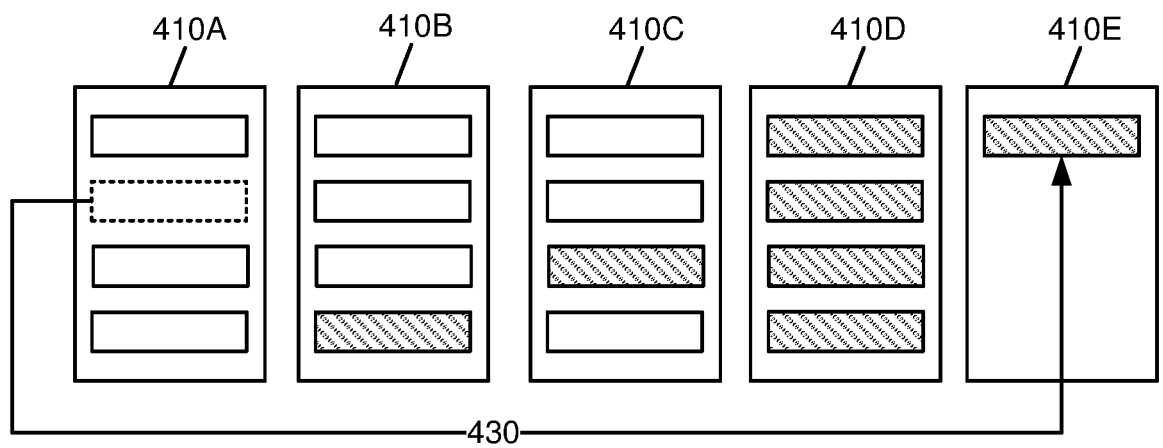

Referring now to FIG. 4B, the first journal group 410A only includes one journal 420A that was modified in the backup process, and therefore the number of modified journals (i.e., one) is less than the threshold value of two. Therefore, a new journal group 410E is initialized or otherwise generated, and journal 420A is migrated 430 (e.g., by storage system 110) from the first journal group 410A to the new journal group 410E.

Figure 4C:
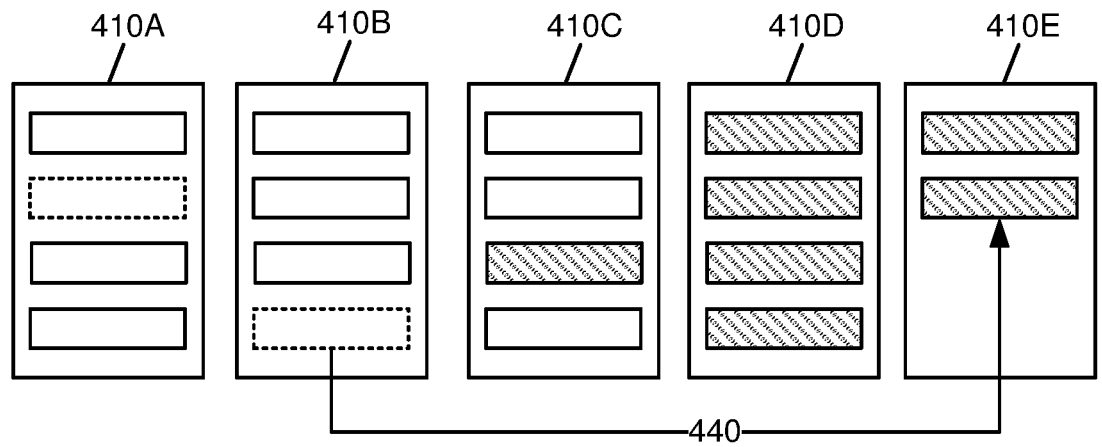

Referring now to FIG. 4C, the second journal group 410B only includes one journal 420B that was modified in the backup process. Therefore, journal 420B is migrated 440 from the second journal group 410B to the new journal group 410E.

Figure 4D:
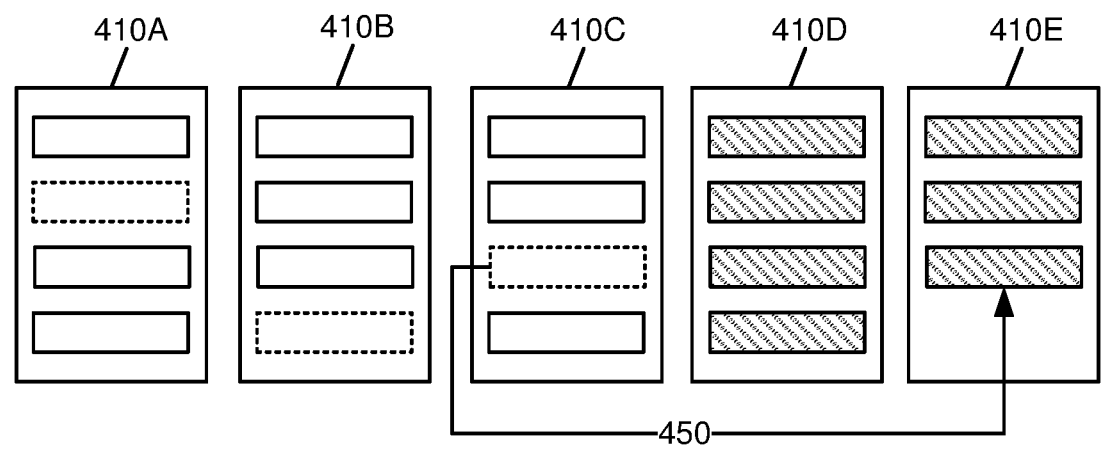

Referring now to FIG. 4D, the third journal group 410C only includes one journal 420C that was modified in the backup process. Therefore, journal 420C is migrated 450 from the third journal group 410C to the new journal group 410E. After the migration 450, the example journal migration may be completed.

As illustrated in FIG. 4A-4D, the example journal migration consolidated the journals accessed during the given backup process from four journal groups 410 (as shown in FIG. 4A) to two (as shown in FIG. 4D), such that a later backup process similar to the given backup process may be able to be performed with access to a smaller number of journal groups. Further, after the journal migration, the migrated journals 420 are now stored in the order of their use during the given backup process. Accordingly, the example journal migration may reduce the number of I/O operations required during a later backup process, and may thereby improve the performance of a deduplication storage system (e.g., storage system 100 shown in FIG. 1).

FIGS. 5 and 6A-6C—Example Process for Journal Migration

Figure 5:
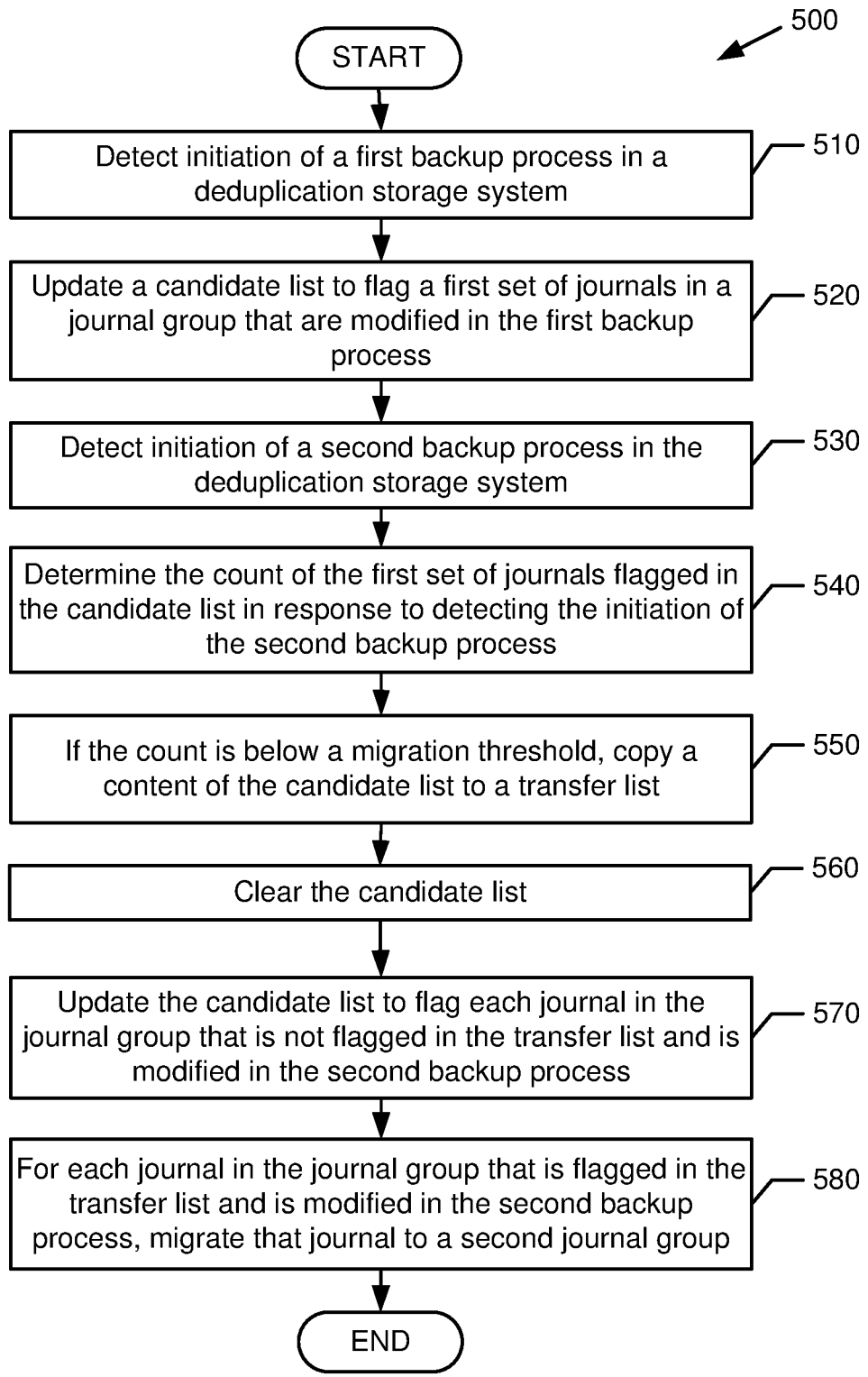
FIG. 5 is an illustration of an example process, in accordance with some implementations.

Referring now to FIG. 5, shown is an example process 500 for journal migration, in accordance with some implementations. The process 500 may be performed by the storage controller 110 executing instructions. The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 are described below with reference to FIGS. 1A-6C, which show examples in accordance with some implementations. However, other implementations are also possible.

Figure 6A:
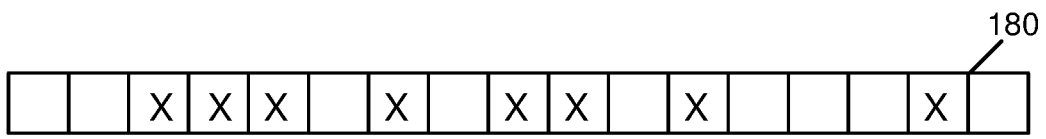
FIGS. 6A-6C are illustrations of example data structures, in accordance with some implementations.
Figure 6B:
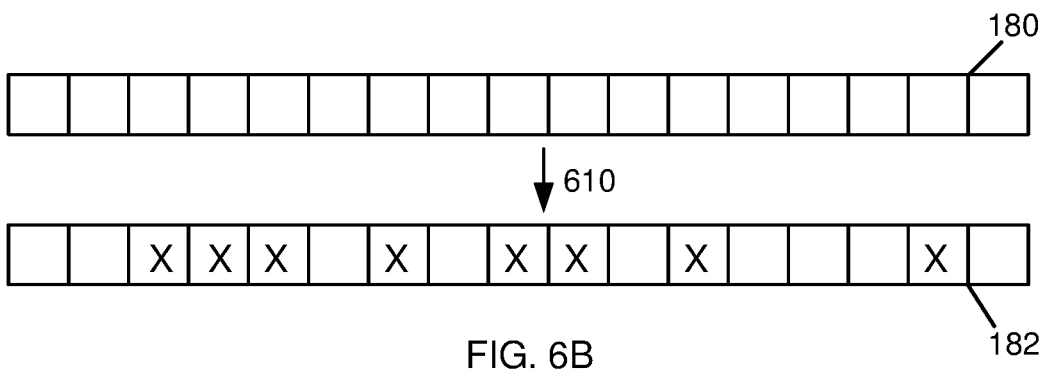
Figure 6C:
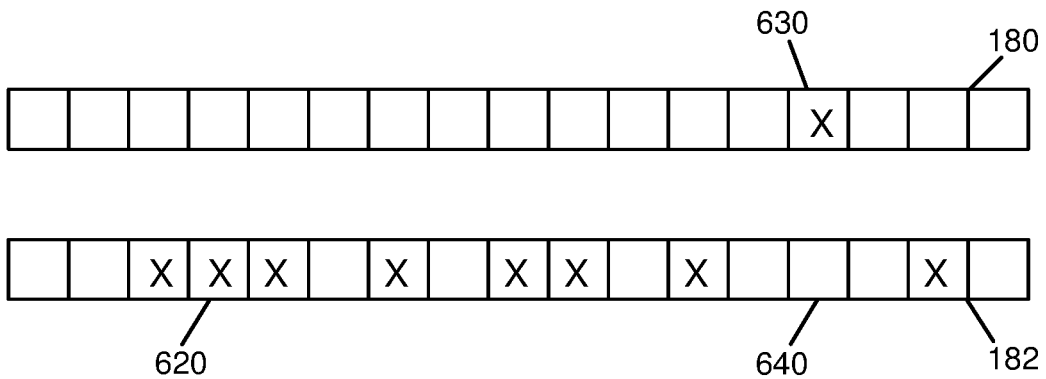

Block 510 may include detecting initiation of a first backup process in a deduplication storage system. Block 520 may include updating a candidate list to flag a first set of journals in a journal group that are modified in the first backup process. For example, referring to FIGS. 1A-1B, the storage controller 110 detects initiation of a first backup process in the storage system 100 (e.g., by detecting a new backup identifier 186 in the journal group 120). The first backup process may include storing a copy of a data stream in the persistent storage 140. Further, as shown in FIG. 6A, the storage controller 110 populates the candidate list 180 to flag the journals 130 in a first journal group 120 that are modified during the first backup process. In some examples, the candidate list 180 may be an ordered array of flags (e.g., bit values), with each flag corresponding to a different journal 130 in the journal group 120. In such examples, a flag is set (e.g., to a bit value "1") to indicate that the corresponding journal 130 was modified during the backup process.

Block 530 may include detecting initiation of a second backup process in the deduplication storage system. Block 540 may include determining the count of the first set of journals in the candidate list in response to detecting the initiation of the second backup process. For example, referring to FIGS. 1A-1B, the storage controller 110 detects the initiation of a second backup process in the storage system 100 (e.g., based on a new backup identifier 186). In response to this detection, the storage controller 110 counts the journals 130 that were flagged (illustrated with an "X" in FIG. 6A) in the candidate list 180. This count indicates how many journals 130 in the first journal group 120 were modified from the start of the first backup process to the end of the first backup process.

Block 550 may include, if the count (determined at block 540) is below a migration threshold, copying a content of the candidate list to a transfer list. Block 560 may include clearing the candidate list. For example, referring to FIGS. 1A-6B, the storage controller 110 determines that the count of the journals 130 flagged in the candidate list 180 is below a migration threshold. In response to this determination, the storage controller 110 performs a copy 610 of the flag array of the candidate list 180 to the transfer list 182. The storage controller 110 clears the content of the candidate list 180 (e.g., resets all flags to a "0" value that indicates a journal that was not modified). Alternatively, if it is determined that the count of the journals 130 flagged in the candidate list 180 is not below the migration threshold, the storage controller 110 does not perform the copy 610, and also clears the existing content of the transfer list 182 (e.g., any flags copied into the transfer list 182 prior to the initiation of the second backup process).

Block 570 may include updating the candidate list to flag each journal in the journal group that is not flagged in the transfer list and is modified in the second backup process. For example, referring to FIGS. 1A-6C, the storage controller 110 determines that a first journal 130 was modified during the second backup process, and also determines that the flag 640 for the first journal 130 is not set in the transfer list 182 (i.e., indicating that the first journal 130 was not modified during the first backup process). Therefore, in response to these determinations, the storage controller 110 sets a flag 630 in the candidate list 180 (illustrated with an "X" in FIG. 6C) to indicate that the first journal 130 was modified during the second backup process. The set flag 630 may be transferred to the transfer list 182 after the second backup process is completed (e.g., if the count of flagged journals 130 in the candidate list 180 is again below the migration threshold).

Block 580 may include, for each journal in the journal group that is flagged in the transfer list and is modified in the second backup process, migrate that journal to a second journal group. For example, referring to FIGS. 1A-6C, the storage controller 110 determines that a second journal 130 was modified during the second backup process, and also determines that the flag 620 for the second journal 130 is set in the transfer list 182 (i.e., indicating that the second journal 130 was previously modified during the first backup process). Therefore, the storage controller 110 determines that the second journal 130 has satisfied the migration condition (i.e., was modified in both of the consecutive first and second backup process), and in response migrates the second journal 130 to a second journal group 120 (e.g., a new journal group 120). This migration process can be repeated for other journals 130 that are modified during the second backup process, and are also flagged in the transfer list 182. In some implementations, each journal 130 can only be migrated once during a given backup process. After block 580, the process 500 may be completed.

In the example implementation shown in FIG. 5, each journal 130 may be migrated separately when it is accessed during the second backup process. However, other implementations are possible. For example, if it is determined that the count of the journals 130 flagged in the candidate list 180 is below the migration threshold (i.e., after the first backup process is completed), the storage controller 110 may migrate all journals 130 flagged in the candidate list 180 as a group. In such examples, the journal migration may be performed as a batch process, and may not include populating the transfer list 182.

Figure 7:
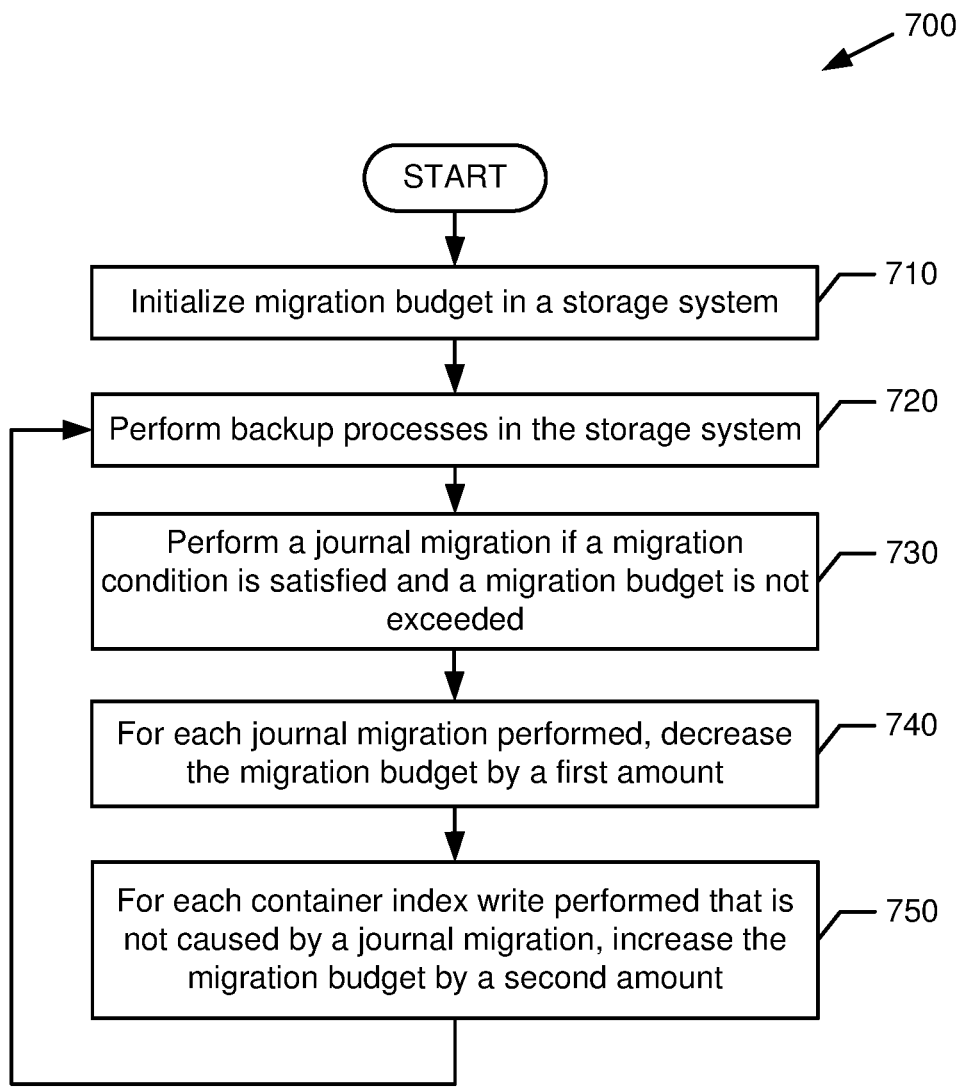
FIG. 7 is an illustration of an example process, in accordance with some implementations.

FIG. 7—Example Process for Controlling Journal Migration

Referring now to FIG. 7, shown is an example process 700 for controlling journal migration, in accordance with some implementations. The process 700 may be performed by the storage controller 110 executing instructions. The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 may be described below with reference to FIGS. 1-6C, which show examples in accordance with some implementations. However, other implementations are also possible.

Block 710 may include initializing a migration budget in a storage system. For example, referring to FIG. 1, the storage controller 110 initializes the migration budget 184 in response to a system event, a user command, etc. Upon initialization, the migration budget 184 may be set to a value that is specified to prevent the performance cost of writing container indexes 160 during journal migrations from reaching an unacceptable level (e.g., larger than the performance benefit of the journal migrations). In some examples, the migration budget 184 may be implemented as an unsigned integer counter.

Block 720 may include performing backup processes in the storage system. For example, referring to FIG. 1, the storage system 100 receives multiple data streams to be stored in the persistent storage 140. In some examples, each data stream (or a set of data streams) may be processed as a separate backup process. In some examples, the storage controller 110 may perform deduplication of each backup process.

Block 730 may include performing a journal migration if a migration condition is satisfied and a migration budget is not exceeded. For example, referring to FIGS. 1-6C, the storage controller 110 populates the candidate list 180 to flag or otherwise identify the journals 130 in a first journal group 120 that are modified during a first backup process. Upon detecting an initialization of a second backup process, the storage controller 110 determines the count of the journals 130 that are flagged in the candidate list 180, and determines whether this count is below a migration threshold. If so, the storage controller 110 copies the contents of the candidate list 180 into the transfer list 182 and clears the candidate list 180. Subsequently, the storage controller 110 determines that a migration condition for a second journal 130 has been satisfied (e.g., the second journal 130 was modified during the second backup process, and the flag 620 for the second journal 130 is set in the transfer list 182). If the migration condition has been satisfied, the storage controller 110 determines whether the migration budget 184 is currently exceeded. If the migration budget 184 is not currently exceeded, the storage controller 110 migrates the second journal 130 to a second journal group 120. Otherwise, if the migration budget 184 is currently exceeded, the storage controller 110 does not migrate the second journal 130.

Block 740 may include, for each journal migration performed, decrease the migration budget by a first amount. Block 750 may include, for each container index write performed that is not caused by a journal migration, increase the migration budget by a second amount. For example, referring to FIG. 1, the storage controller 110 reduces the migration budget 184 by a first amount (e.g., 1) for each journal migration performed in the storage system 100. Further, the storage controller 110 may increase the migration budget 184 by a second amount (e.g., 0.5) for each write I/O of a container index 160 that is not caused by a journal migration (e.g., a write I/O performed in response to a save command for the container index 160). After block 750, the process 700 may return to block 720 (i.e., to continue performing backup processes in the storage system).

Figure 8:
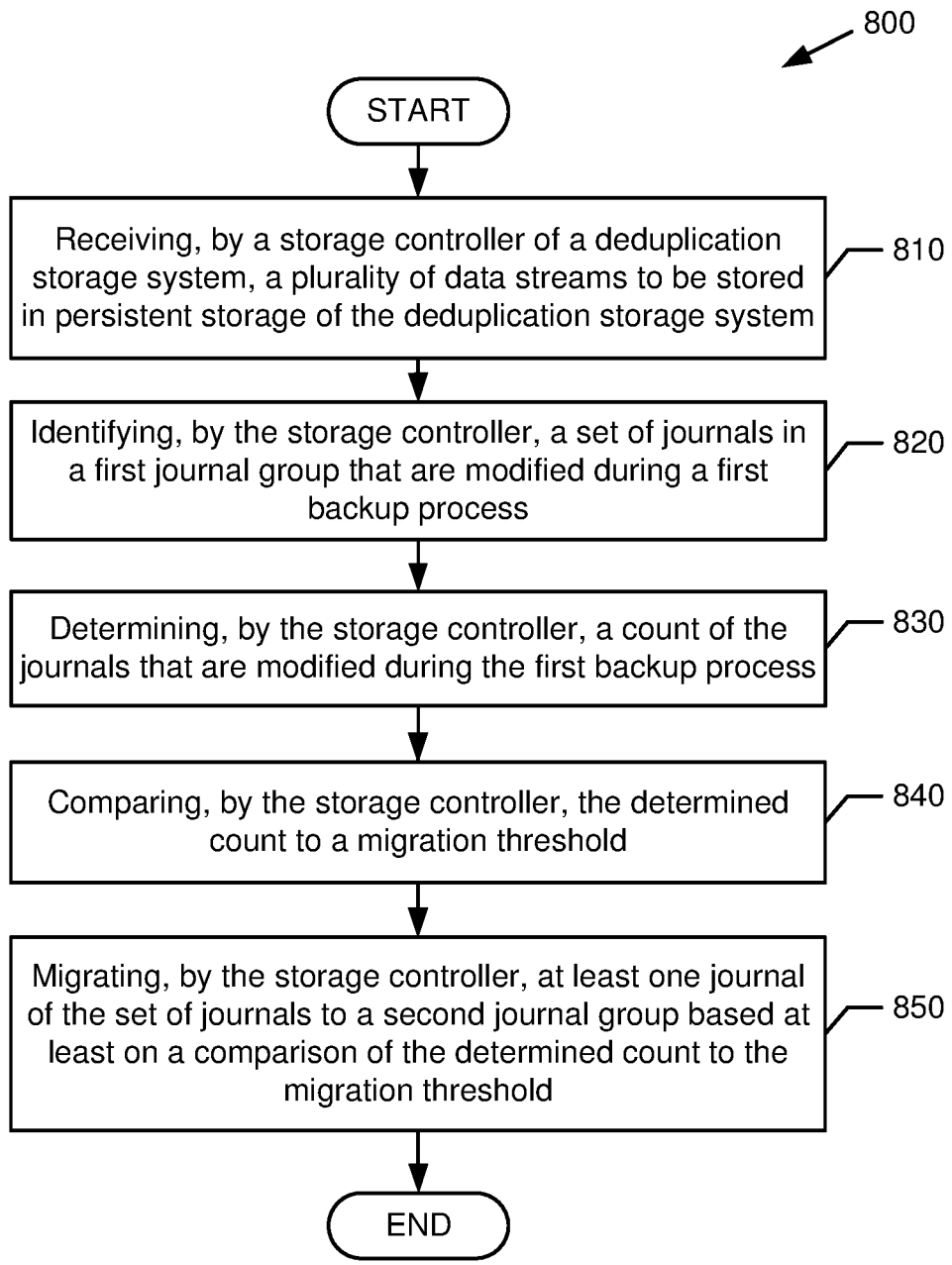
FIG. 8 is an illustration of an example process, in accordance with some implementations.

FIG. 8—Example Process for Journal Migration

Referring now to FIG. 8, shown is an example process 800 for journal migration, in accordance with some implementations. The process 800 may be performed by the storage controller 110 executing instructions. The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 are described below with reference to FIGS. 1-6C, which show examples in accordance with some implementations. However, other implementations are also possible.

Block 810 may include receiving, by a storage controller of a deduplication storage system, a plurality of data streams to be stored in persistent storage of the deduplication storage system. Block 820 may include identifying, by the storage controller, a set of journals in a first journal group that are modified during a first backup process. For example, referring to FIGS. 1A-6A, the storage controller 110 detects initiation of a first backup process in the storage system 100. The storage controller 110 identifies which journals 130 of a first journal group 120 are modified during the first backup process, and flags the identified journals 130 (illustrated with an "X" in FIG. 6A) in the candidate list 180.

Block 830 may include determining, by the storage controller, a count of the journals that are modified during the first backup process. For example, referring to FIGS. 1A-6A, the storage controller 110 detects the initiation of a second backup process in the storage system 100 (e.g., by detecting a changed backup identifier 186). In response to this detection, the storage controller 110 counts the journals 130 that were flagged in the candidate list 180.

Block 840 may include comparing, by the storage controller, the determined count to a migration threshold. Block 850 may include migrating, by the storage controller, at least one journal of the identified set of journals to a second journal group based at least on a comparison of the determined count to the migration threshold. For example, referring to FIGS. 1A-6B, the storage controller 110 determines that the count of the journals 130 flagged in the candidate list 180 is below a migration threshold, and in response performs a copy 610 of the flag array of the candidate list 180 to the transfer list 182. Subsequently, the storage controller 110 determines that a second journal 130 was modified during the second backup process, and also determines that the flag 620 for the second journal 130 is set in the transfer list 182. In response to these determinations, the storage controller 110 migrates the second journal 130 to a second journal group 120. After block 850, the process 800 may be completed.

Figure 9:
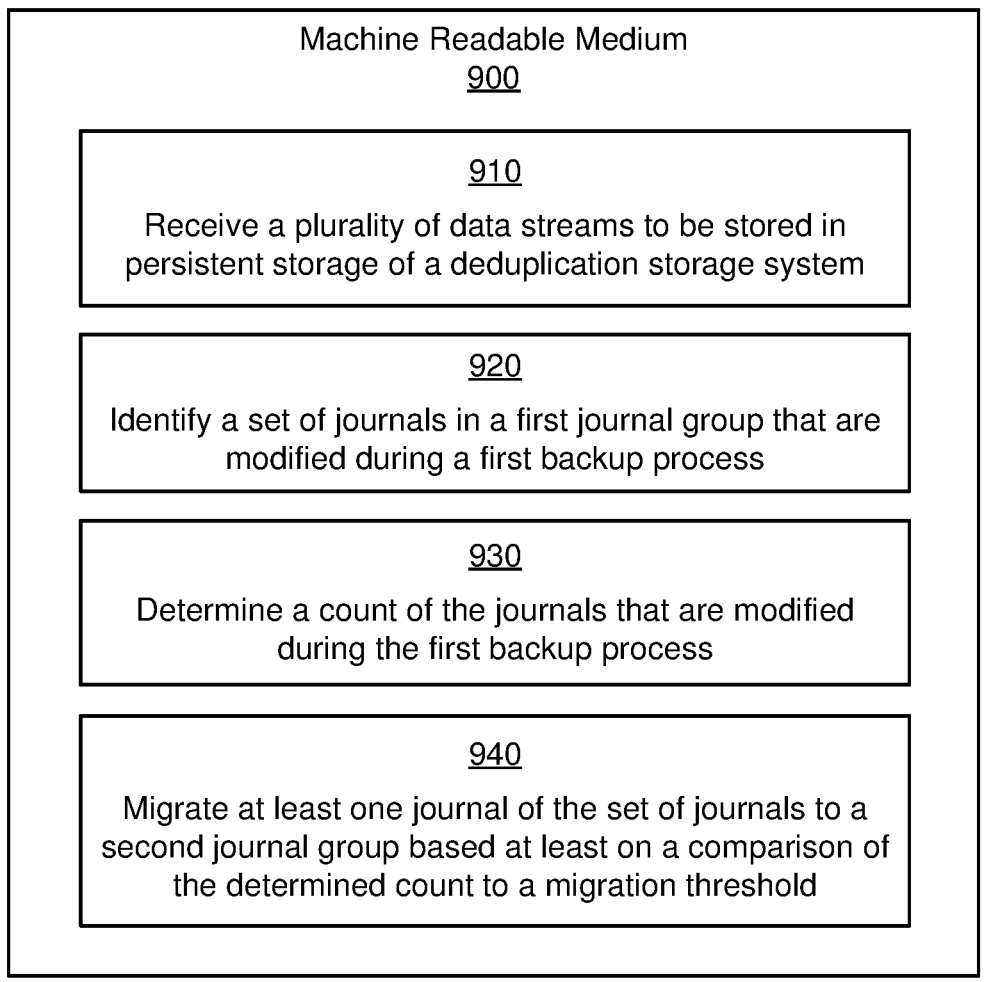
FIG. 9 is a diagram of an example machine-readable medium storing instructions in accordance with some implementations.

FIG. 9—Example Machine-Readable Medium

FIG. 9 shows a machine-readable medium 900 storing instructions 910-940, in accordance with some implementations. The instructions 910-940 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to receive a plurality of data streams to be stored in persistent storage of a deduplication storage system. Instruction 920 may be executed to identify a set of journals in a first journal group that are modified during a first backup process. Instruction 930 may be executed to determine a count of the journals that are modified during the first backup process. Instruction 940 may be executed to migrate at least one journal of the identified set of journals to a second journal group based at least on a comparison of the determined count to a migration threshold.

Figure 10:
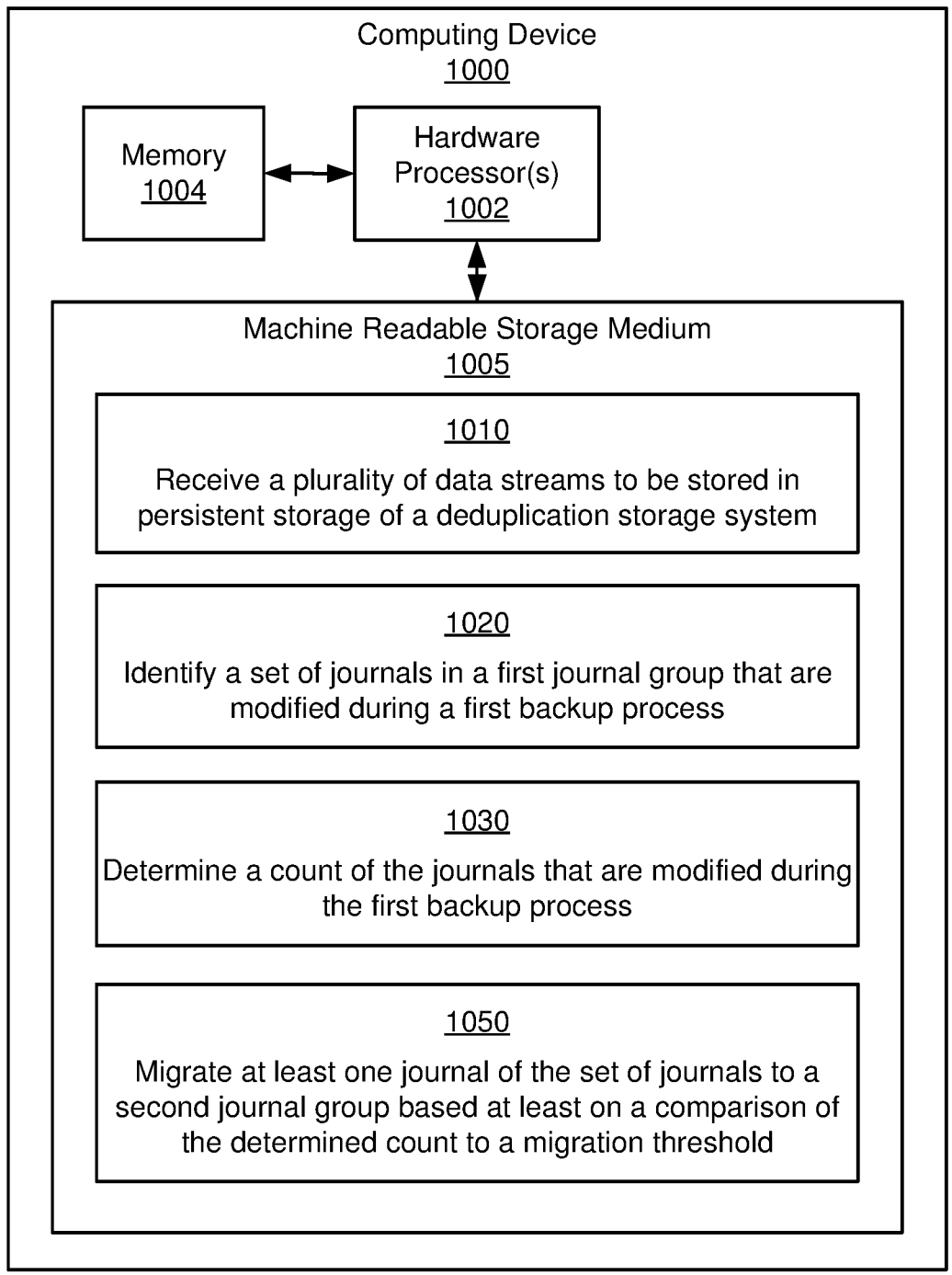
FIG. 10 is a schematic diagram of an example computing device, in accordance with some implementations.

FIG. 10—Example Computing Device

FIG. 10 shows a schematic diagram of an example computing device 1000. In some examples, the computing device 1000 may correspond generally to some or all of the storage system 100 (shown in FIG. 1). As shown, the computing device 1000 may include a hardware processor 1002, a memory 1004, and machine-readable storage 1005 including instructions 1010-1040. The machine-readable storage 1005 may be a non-transitory medium. The instructions 1010-1040 may be executed by the hardware processor 1002, or by a processing engine included in hardware processor 1002.

Instruction 1010 may be executed to receive a plurality of data streams to be stored in persistent storage of a deduplication storage system. Instruction 1020 may be executed to identify a set of journals in a first journal group that are modified during a first backup process. Instruction 1030 may be executed to determine a count of the journals that are modified during the first backup process. Instruction 1040 may be executed to migrate at least one journal of the identified set of journals to a second journal group based at least on a comparison of the determined count to a migration threshold.

In accordance with some implementations of the present disclosure, a storage system may migrate journals between journal groups to reduce or control the dispersal of the journals. In some implementations, a controller may identify a set of journals in a first journal group that are modified during a first backup process, and determine a count of the identified set of journals. The storage controller may migrate a journal to a second journal group based at least on the comparison of the count of the modified journals to the migration threshold. In this manner, the journals to be accessed during a subsequent backup process may be consolidated into fewer journals groups. Accordingly, some implementations may reduce the number of I/O operations to read journals, and may thereby improve the performance of the deduplication storage system.

Note that, while FIGS. 1A-10 show various examples, implementations are not limited in this regard. For example, referring to FIG. 1A, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A deduplication storage system comprising:
a processor;
a memory; and
a machine-readable storage medium storing instructions, the instructions executable by the processor to:
receive a plurality of data streams to be stored in persistent storage of the deduplication storage system;

identify a set of journals in a first journal group that are modified during a first backup process;
determine a count of the journals that are modified during the first backup process; and
migrate at least one journal of the set of journals to a second journal group based at least on a comparison of the determined count to a migration threshold.

2. The storage system of claim 1, including instructions executable by the processor to:
update a candidate list to flag the journals that are modified during the first backup process.

3. The storage system of claim 2, including instructions executable by the processor to:
detect an initiation of a second backup process;
in response to a detection of the initiation of the second backup process:
determine a count of the flagged journals in the candidate list;
compare the count of the flagged journals to the migration threshold; and
in response to a determination that the count of the flagged journals is below the migration threshold, copy a content of the candidate list to a transfer list.

4. The storage system of claim 3, including instructions executable by the processor to:
in response to determining that the at least one journal is modified in the second backup process and is flagged in the transfer list, migrate the at least one journal to the second journal group.

5. The storage system of claim 3, including instructions executable by the processor to:
in response to determining that the at least one journal is modified in the second backup process and is flagged in the transfer list:
determine whether a migration budget is currently exceeded;
migrate the at least one journal in response to a determination that the migration budget is not currently exceeded; and
block a migration of the at least one journal in response to a determination that the migration budget is currently exceeded.

6. The storage system of claim 5, including instructions executable by the processor to:
for each journal migration performed, decrease the migration budget by a first amount; and
for each container index write performed that is not caused by a journal migration, increase the migration budget by a second amount.

7. The storage system of claim 6, wherein the first amount is larger than the second amount.

8. The storage system of claim 3, including instructions executable by the processor to:
detect the initiation of the second backup process based on a change to a backup identifier,
wherein the backup identifier, the candidate list, and the transfer list are stored in the first journal group.

9. The storage system of claim 3, including instructions executable by the processor to:
in response to the detection of the initiation of the second backup process, clear the candidate list; and
after clearing the candidate list, in response to determining that a particular journal is modified in the second backup process and is not flagged in the transfer list, flag the particular journal in the candidate list.

10. The storage system of claim 2, wherein the candidate list comprises an ordered array of flags, each flag corresponding to a different journal in the first journal group.

11. A method comprising:
receiving, by a storage controller of a deduplication storage system, a plurality of data streams to be stored in persistent storage of the deduplication storage system;
identifying, by the storage controller, a set of journals in a first journal group that are modified during a first backup process;
determining, by the storage controller, a count of the journals that are modified during the first backup process;
comparing, by the storage controller, the determine count to a migration threshold; and
migrating, by the storage controller, at least one journal of the set of journals to a second journal group based at least on a comparison of the determined count to the migration threshold.

12. The method of claim 11, further comprising:
updating a candidate list to flag the set of journals that are modified during the first backup process;
detecting an initiation of a second backup process;
in response to detecting the initiation of the second backup process:
determining a count of flagged journals in the candidate list;
comparing the count of flagged journals to the migration threshold; and
in response to a determination that the count of flagged journals is below the migration threshold, copying a content of the candidate list to a transfer list,
wherein the candidate list and the transfer list are stored in the first journal group.

13. The method of claim 12, further comprising:
in response to determining that the at least one journal is modified in the second backup process and is flagged in the transfer list, migrating the at least one journal to the second journal group.

14. The method of claim 12, further comprising:
in response to determining that the at least one journal is modified in the second backup process and is flagged in the transfer list:
determining whether a migration budget is currently exceeded; and
migrating the at least one journal in response to a determination that the migration budget is not currently exceeded.

15. The method of claim 14, further comprising:
for each journal migration performed in the deduplication storage system, decreasing the migration budget by a first amount; and
for each container index write performed that is not caused by a journal migration, increasing the migration budget by a second amount,
wherein the first amount is larger than the second amount.

16. A non-transitory machine-readable medium storing instructions that upon execution cause a processor to:
receive a plurality of data streams to be stored in persistent storage of a deduplication storage system;
identify a set of journals in a first journal group that are modified during a first backup process;
determine a count of the journals that are modified during the first backup process; and migrate at least one journal of the set of journals to a second journal group based at least on a comparison of the determined count to a migration threshold.

17. The non-transitory machine-readable medium of claim 16, including instructions that upon execution cause the processor to:

update a candidate list to flag the set of journals that are modified during the first backup process;

detect an initiation of a second backup process;

in response to a detection of the initiation of the second backup process:

determine a count of flagged journals in the candidate list;

compare the count of the flagged journals to the migration threshold; and in response to a determination that the count of flagged journals is below the migration threshold, copy a content of the candidate list to a transfer list, wherein the candidate list and the transfer list are stored in the first journal group.

18. The non-transitory machine-readable medium of claim 17, including instructions that upon execution cause the processor to:

in response to determining that the at least one journal is modified in the second backup process and is flagged in the transfer list, migrate the at least one journal to the second journal group.

19. The non-transitory machine-readable medium of claim 17, including instructions that upon execution cause the processor to:

in response to determining that the at least one journal is modified in the second backup process and is flagged in the transfer list:

determine whether a migration budget is currently exceeded; and migrate the at least one journal in response to a determination that the migration budget is not currently exceeded.

20. The non-transitory machine-readable medium of claim 19, including instructions that upon execution cause the processor to:

for each journal migration performed, decrease the migration budget by a first amount; and for each container index write performed that is not caused by a journal migration, increase the migration budget by a second amount.

* * * * *